United States Patent
Kowarz et al.

(10) Patent No.: US 6,282,012 B1
(45) Date of Patent: Aug. 28, 2001

(54) METHOD FOR DAMPING RIBBON ELEMENTS IN A MICROMECHANICAL GRATING DEVICE BY SELECTION OF ACTUATION WAVEFORM

(75) Inventors: Marek W. Kowarz, Rochester; John C. Brazas, Jr., Hilton, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/459,301

(22) Filed: Dec. 10, 1999

(51) Int. Cl.[7] .................................................. G02B 26/00
(52) U.S. Cl. .......................... 359/291; 359/572; 359/573; 359/231
(58) Field of Search .................................. 359/290, 291, 359/572, 573, 295, 224, 230, 231

(56) References Cited

U.S. PATENT DOCUMENTS

| | | | |
|---|---|---|---|
| 5,311,360 | 5/1994 | Bloom et al. | 359/572 |
| 5,459,610 | 10/1995 | Bloom et al. | 359/572 |
| 6,038,057 | * 3/2000 | Brazas, Jr. et al. | 359/291 |
| 6,144,481 | * 11/2000 | Kowarz et al. | 359/291 |
| 6,172,796 | * 1/2001 | Kowarz et al. | 359/290 |
| 6,181,458 | * 1/2001 | Brazas, Jr. et al. | 359/290 |

OTHER PUBLICATIONS

F. S. A. Sandejas, "Silicon Microfabrication of Grating Light Valves," Jul. 1995, Ph.D. Dissertation, pp. 1–108.
Gudeman, et al., "Squeeze Film Damping of Doubly Supported Ribbons in Noble Gas Atmospheres," Jun. 1998, *Solid–State Sensor and Actuator Workshop*, pp. 288–291.

* cited by examiner

*Primary Examiner*—Loha Ben
(74) *Attorney, Agent, or Firm*—Thomas H. Close

(57) ABSTRACT

A method for damping electro-mechanical ribbon elements over a channel defining a bottom surface and having a bottom conductive layer formed below the bottom surface includes the steps of: providing at least one constant amplitude voltage pulse to at least one ribbon element wherein the actuation pulse causes the ribbon element to contact the bottom surface of the channel; and providing at least one braking pulse to the ribbon elements wherein the braking pulse is separated by a narrow temporal gap from the constant amplitude voltage pulse. Furthermore, the method can also provide a sophisticated damping for ribbon elements which are actuated so that they do not contact the bottom of the channel.

21 Claims, 9 Drawing Sheets

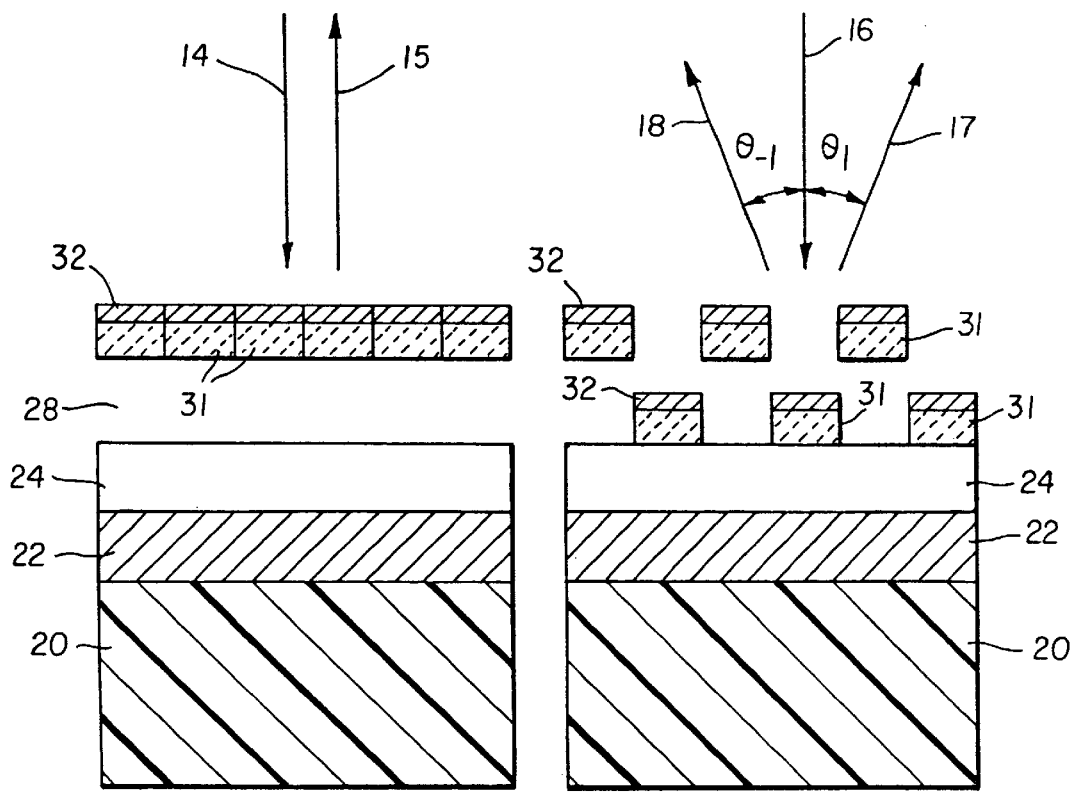
FIG. 1a (PRIOR ART)
FIG. 1b (PRIOR ART)
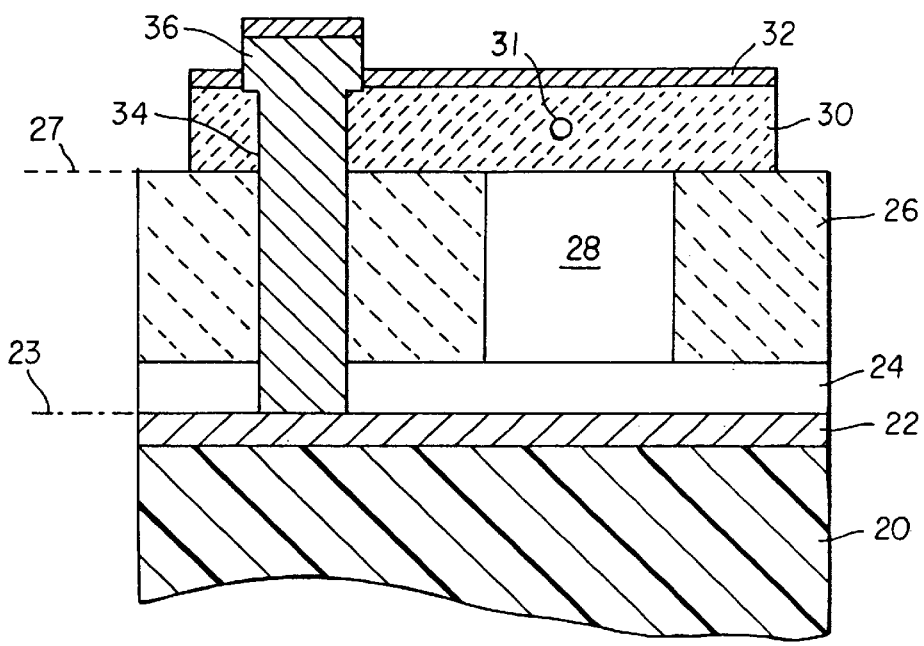
FIG. 2 (PRIOR ART)

METHOD FOR DAMPING RIBBON ELEMENTS IN A MICROMECHANICAL GRATING DEVICE BY SELECTION OF ACTUATION WAVEFORM

FIELD OF THE INVENTION

This invention relates to modulating an incident light beam with a mechanical grating device and more particularly to a method for actuating a mechanical grating device that functions to diffract a light beam.

BACKGROUND OF THE INVENTION

Electro-mechanical spatial light modulators have been designed for a variety of applications, including image processing, display, optical computing and printing. Electro-mechanical gratings for spatial light modulation are well known in the patent literature; see U.S. Pat. No. 5,311,360, issued May 10, 1994, to Bloom et al., entitled "Method and Apparatus for Modulating a Light Beam". This device, which is also known as a grating light valve (GLV), was later described by Bloom et al. with changes in the structure that included: 1) patterned raised areas beneath the ribbons to minimize contact area to obviate stiction between the ribbon and substrate; 2) an alternative device design in which the spacing between ribbons was decreased and alternate ribbons were actuated to produce good contrast; 3) solid supports to fix alternate ribbons; and 4) an alternative device design that produced a blazed grating by rotation of suspended surfaces see U.S. Pat. No. 5,459,610, issued Oct. 17, 1995 to Bloom et al., entitled "Deformable Grating Apparatus for Modulating a Light Beam and Including Means for Obviating Stiction Between Grating Elements and Underlying Substrate".

According to the prior art, for operation of the GLV device, an attractive electrostatic force is produced by a single polarity voltage difference between the ground plane and the conducting layer atop the ribbon layer. This attractive force changes the heights of the ribbons relative to the substrate. Modulation of the diffracted optical beam is obtained by appropriate choice of the voltage waveform. The voltage needed to actuate a ribbon a certain distance depends on several factors including the stress in the ribbon material, the distance between the ribbons and substrate, and the ribbon length.

It is well known that the ribbon elements of the GLV device possess a resonant frequency which depends primarily on the length of the ribbons and the density and tension of the ribbon material; see for example "Silicon Microfabrication of Grating Light Valves," Ph.D. Thesis, Stanford University 1995, Chapter 3, by F. S. A. Sandejas. When a ribbon is actuated or released, it rings at its resonant frequency, which is typically between 1 and 15 MHz. The mechanical response of the ribbon elements is damped by the surrounding gas as described in "Squeeze Film Damping of Double Supported Ribbons in Noble Gas Atmospheres," Proc. Of Solid-State Sensor and Actuator workshop, Hilton, Head, SC, June 8–11, 198, pp. 288–291. This damping depends on the type of gas present and pressure, and determines the width of the resonant peak associated with the resonant frequency of the ribbons. As a result of this resonant ringing, the maximum frequency at which the GLV device can be operated is limited, and the diffracted light intensity contains undesirable temporal variations. There is a need therefore for a GLV device having increased operating speed and reduced temporal light intensity variations.

SUMMARY OF THE INVENTION

It is an object of the present invention to provide a method for actuating the ribbon elements of an electromechanical grating device so that the diffracted light intensity does not contain any undesirable temporal variations caused by the resonance of said ribbon elements, thereby producing a more ideal output that will allow higher frequency operation of the device. The above object is accomplished by a method for damping electro-mechanical ribbon elements suspended over a channel defining a bottom surface and having a bottom conductive layer formed below said bottom surface, the method comprises the steps of: providing at least one constant amplitude voltage pulse to at least one ribbon element to cause the ribbon element to contact the bottom surface of the channel; and providing at least one braking pulse to said ribbon elements wherein said braking pulse is separated by a narrow gap from said constant amplitude voltage pulse.

According to a further aspect of the invention, the above object is also accomplished by a method for damping electro-mechanical ribbon elements suspended over a channel defining a bottom surface and having a bottom conductive layer formed below said bottom surface, the method comprises the steps of: providing at least one constant amplitude voltage pulse to at least one ribbon element wherein said constant amplitude voltage pulse causes said ribbon element to be drawn into the channel wherein said ribbon element is in a suspended actuated state above the bottom of the channel; and providing at least two braking pulses to said ribbon elements wherein an initial braking pulse immediately precedes said constant amplitude voltage pulse and a final braking pulse immediately follows said constant amplitude voltage pulse.

It is an advantage of the inventive method that the light intensity diffracted by the electromechanical grating device that any undesirable temporal variations caused by the resonance of the ribbon elements are substantially reduced. The method allows high-frequency operation of the device which is especially important in applications such as displays, photofinishing printers and optical communications.

BRIEF DESCRIPTION OF THE DRAWINGS

The subject matter of the invention is described with reference to the embodiments shown in the drawings.

FIGS. 1a–1b are illustrations of light diffraction by a prior art two-level electro-mechanical grating device in the un-actuated and actuated state respectively;

FIG. 2 is a view perpendicular to the illustration of FIG. 1 showing a suspended unactuated ribbon element above the channel with supporting layers according to the prior art;

DETAILED DESCRIPTION OF THE INVENTION

Figure 3A:
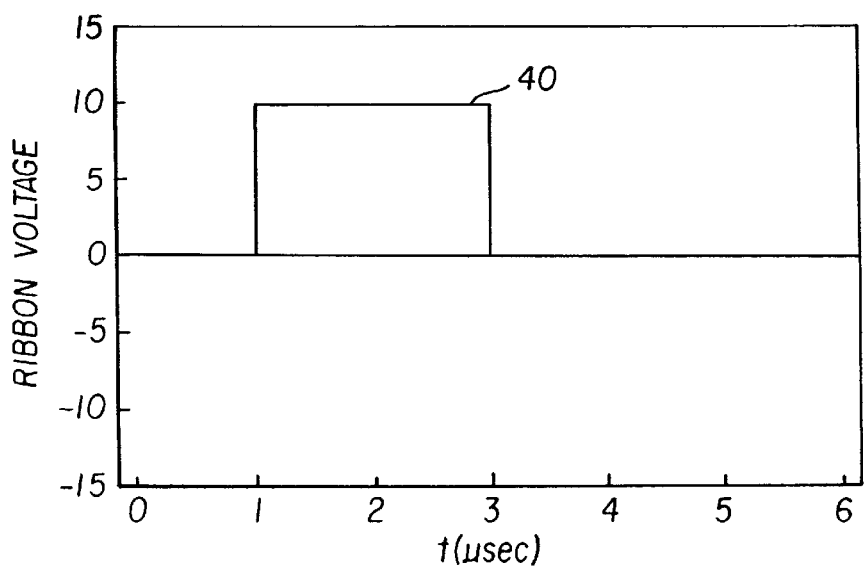
FIGS. 3a–3c are idealized graphs depicting: a) a constant-amplitude voltage pulse that causes the ribbon elements to come into contact with the bottom of the channel; b) the mechanical response of the ribbon elements; and c) the intensity of the light diffracted into the first order as observed in the prior art devices.

The structure of a typical Grating Light Valve (GLV) device is shown in the cross-sectional views in FIGS. 1a, 1b and 2. FIG. 1a depicts the ribbon structure of the device in the un-actuated and FIG. 1b in the actuated state. FIG. 2 is the view of the same device (as shown in FIG. 1a) in the un-actuated state but rotated 90 degrees to provide an insight into the layer build-up of the GLV. Referring to FIG. 2, typically a substrate 20 is provided which may be a single crystal silicon wafer or glass. In the case of a single crystal silicon wafer, a bottom conductive layer 22 is generated by heavily doping the silicon near the surface 23 of the substrate 20. If glass is used as a substrate, the increased conductivity is achieved by depositing a bottom conductive layer 22 on the surface of the glass substrate 20. The conductive layer 22 is covered by a protective layer 24, which can be for the example of a silicon substrate, thermal oxide. A dielectric spacer layer 26 is formed atop the protective layer 24 and contains a channel 28 where the active region of the GLV device is located. The channel 28 defines a depth which is governed by the deposited thickness of the spacer layer 26. The spacer layer 26 defines an upper surface level 27. A plurality of ribbon elements 31 is patterned from a ribbon layer 30 formed atop the spacer layer 26. The ribbon layer 30 comprises a dielectric material, which may be silicon nitride, covered by a conductive and reflective layer 32. The conductive and reflective layer 32 of every other ribbon element 31 is connected to the bottom conductive layer 22 through an opening 34 that is filled with a thick layer of conducting material 36. The thickness and tensile stress of the ribbon layer 30 is chosen to optimize performance by influencing the electrostatic force required for actuation and the returning force, which affects the speed, resonance frequency and voltage requirements of the ribbon elements 31 of the GLV.

For operation of the device, an attractive electrostatic force is produced by a voltage difference between the bottom conductive layer 22 and the reflective and conductive layer 32 atop the ribbon layer 30. In the un-actuated state (see FIG. 1a), with no voltage difference, all of the ribbon elements 31 in the GLV device are suspended above the substrate 20 at the same height. In this state, an incident light beam 14 is primarily reflected into the mirror direction as a reflected light beam 15. To obtain the actuated state (see FIG. 1b), a voltage is applied to every other ribbon element producing a periodic grating. In the fully actuated state every other ribbon element 31 is in contact with the protective layer 24. When the height difference between adjacent ribbons is ¼ of the wavelength of an incident light beam 16' the light beam is primarily diffracted into a $1^{st}$ order 17 and a $-1^{st}$ order 18. Depending on the design, to obtain ¼ wavelength height difference the ribbon elements 31 may be brought into contact with the protective layer 24 or they may be suspended above the protective layer 24. One or both of the diffracted orders can be collected and used by an optical system (not shown), depending on the application. Alternatively, the $0^{th}$ reflected order may be used in certain optical systems. When the applied voltage is removed, the forces due to the tensile stress and the bending moment restore the ribbon elements 31 to their original un-actuated state (see FIG. 1a).

Figure 3B:
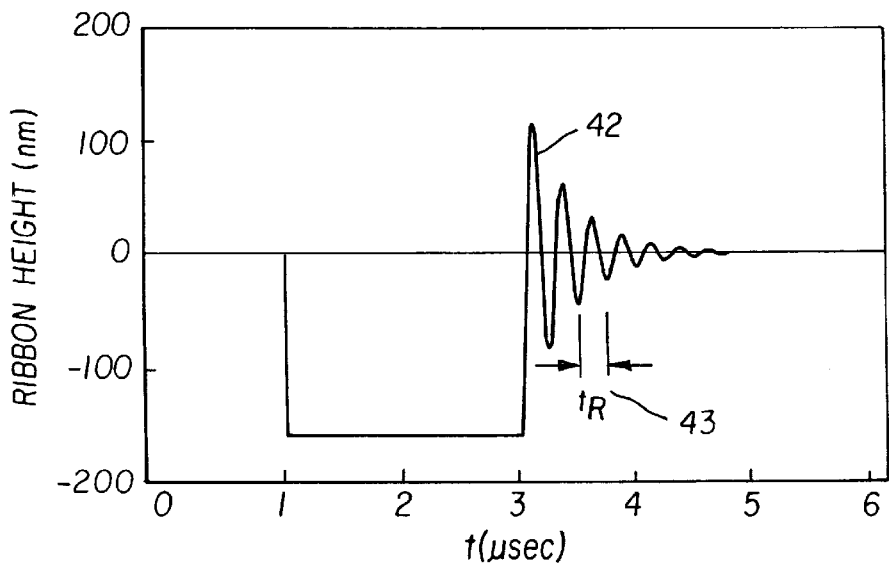
Figure 3C:
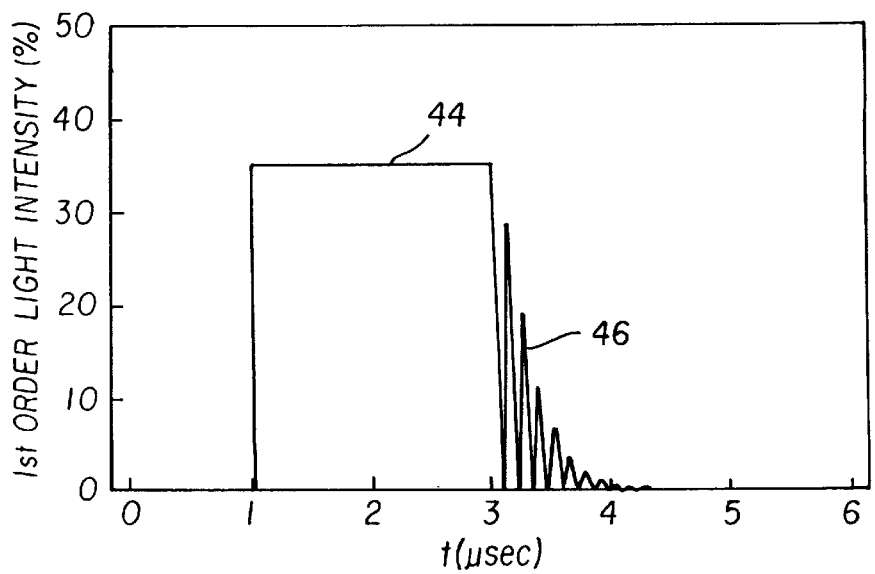

FIGS. 3a–3c show idealized plots of the actuation of a ribbon element 31 by a constant amplitude voltage pulse 40. The constant amplitude voltage pulse 40 is a function of time as shown in FIG. 3a with a duration of 2 μsec at 10 volts. Here the abscissa shows the time in μsec and the ordinate shows the applied voltage in volts. The response of the mechanical position of the ribbon element 31 to voltage pulse 40 is depicted in FIG. 3b, with the abscissa showing the time in μsec and the ordinate showing the mechanical position of the ribbon element 31 in nanometers. When the voltage pulse 40 is switched on, the ribbon element 31 is drawn into the channel 28 of the GLV device and comes into contact with the bottom of the channel 28. The ribbon element 31 stays in the actuated position (drawn into the channel 28 and in contact with the bottom of the channel 28) for the duration of the constant amplitude voltage pulse 40. As soon as the constant amplitude voltage pulse 40 is turned off (after 2 μsec), the ribbon element 31 releases from the bottom of the channel 28 and oscillates in a ringing motion 42 about the initial un-actuated position. The ringing motion has a resonant period $t_R$ 43 and is damped by the surrounding gas. The ribbon element 31 settles to its the initial un-actuated position after a certain time which is governed by a conventional damping function. The time-dependence of the light intensity of the diffracted into the first order resulting from the actuation of the ribbon element 31 is shown in FIG. 3c. Here the abscissa shows the time in μsec and the ordinate shows the percent intensity of the incident light diffracted into the first order. The diffracted intensity 44 is constant during the duration of the voltage pulse 40. After the constant amplitude voltage pulse 40 has been turned off, an intensity fluctuation 46 occurs that is associated with the ringing motion 42 of the ribbon elements 31.

The ringing motion 42 of the ribbon elements 31 and associated light intensity fluctuations 46 have undesirable effects in certain systems, especially in systems that require high frequency modulation of the light intensity. For example, in data communication or data storage application where the light intensity is modulated in accordance to a high-frequency data stream, the residual ringing caused by one voltage pulse will affect the response to a subsequent voltage pulse. This effect, which is sometimes known as inter-symbol interference, has a negative impact on data integrity.

Figure 4A:
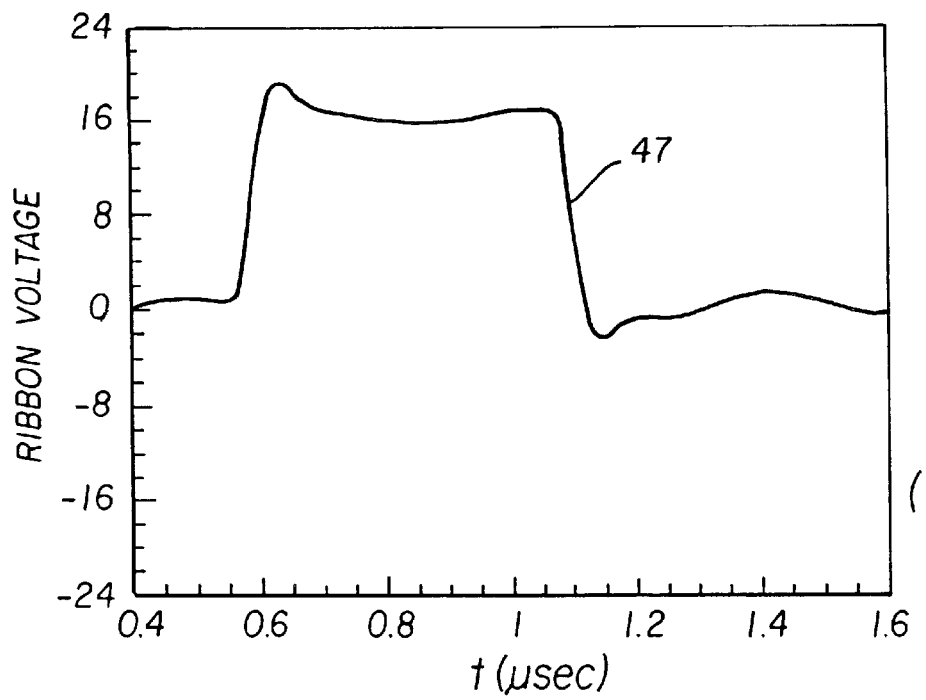
FIGS. 4a–b are experimental results showing a) an actuation voltage pulse and b) the corresponding intensity of the light reflected into the zeroth order as observed in the prior art device.
Figure 4B:
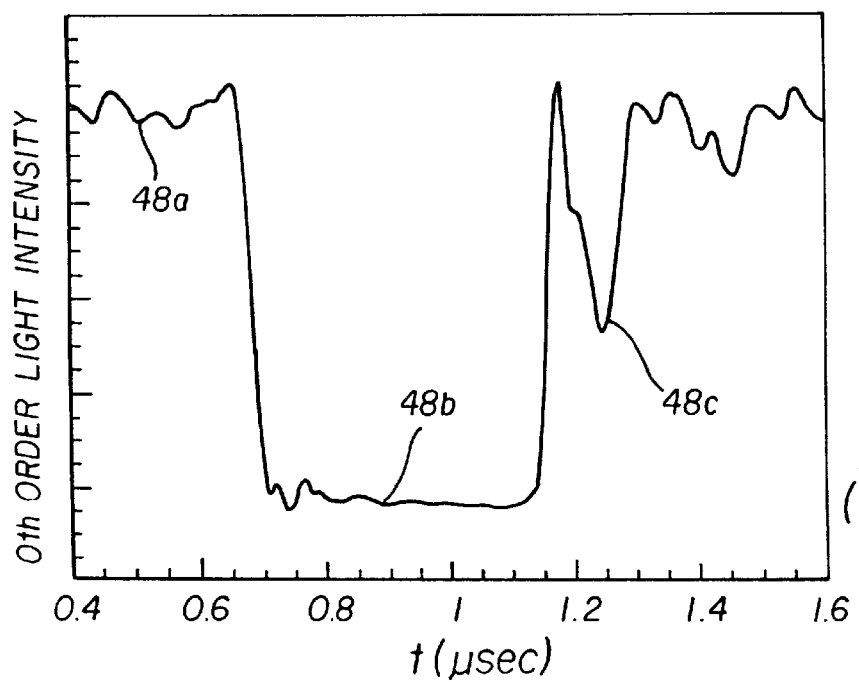

These kinds of intensity fluctuations also occur in systems that make use of the $0^{th}$ order reflected light. FIGS. 4a and 4b show an experimental result wherein a voltage pulse 47 has been applied to a GLV device of the type shown in FIGS. 1 and 2 in a system that collects $0^{th}$ order reflected light. The voltage pulse 47 in FIG. 4a has a duration of approximately 0.5 µsec and an amplitude of approximately 16 volts. The signal from a photodetector measuring the $0^{th}$ order intensity is shown in FIG. 4b (arbitrary units). With no voltage applied to the ribbon elements 31, the majority of the light is reflected into the $0^{th}$ order and the $0^{th}$ order signal 48a is at a high level. During the voltage pulse 47, the $0^{th}$ order signal 48b is constant and at a low level. Ideally, in an optimized device, this low level would be close to zero. After the voltage pulse 47 has been turned off, an intensity fluctuation 48c occurs because of the ringing motion of the ribbon elements 31.

Figure 5A:
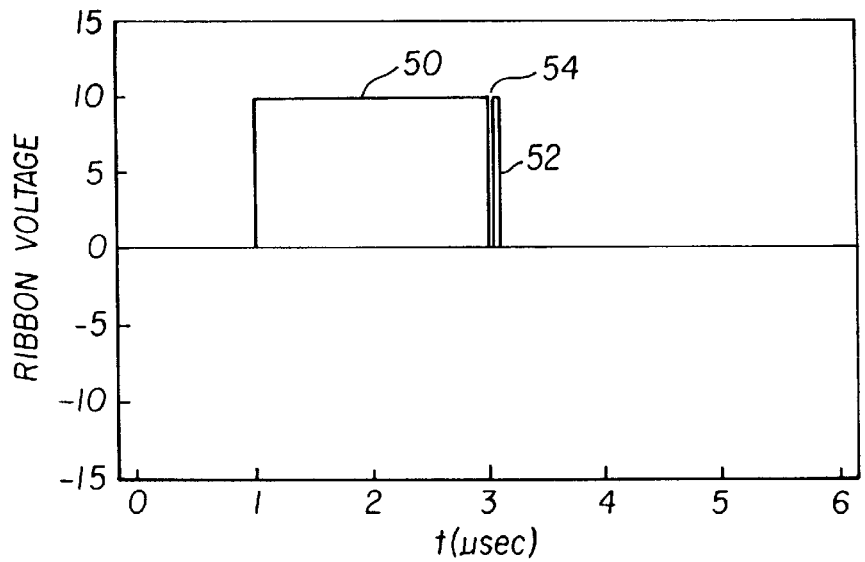
FIGS. 5a–5c are idealized graphs depicting: a) a constant-amplitude voltage pulse that causes the ribbon elements to come into contact with the bottom of the channel followed by a braking pulse; b) the mechanical response of the ribbon elements; and c) the intensity of the light diffracted into the first order according to the present invention.
Figure 5B:
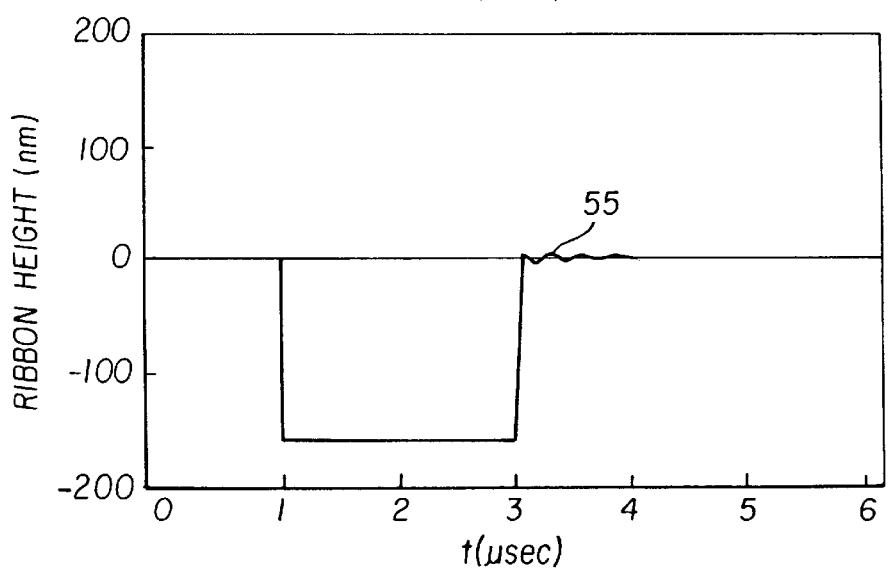
Figure 5C:
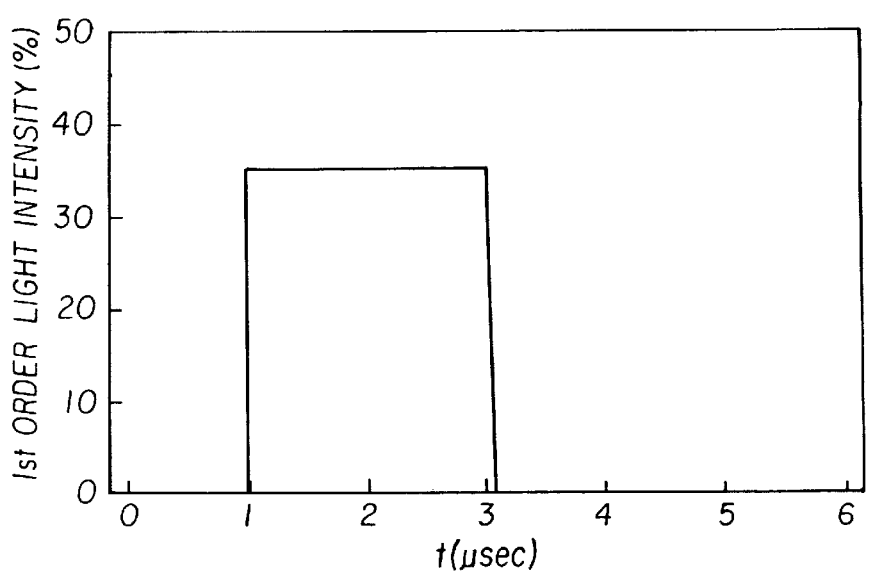

The use of a braking pulse can significantly reduce the ringing of the ribbon elements 31 and the associated intensity fluctuations. FIGS. 5a–5c show idealized plots of the actuation of a ribbon element 31 by a constant amplitude voltage pulse 50 followed by a braking pulse 52. The constant amplitude voltage pulse 50 is a function of time as shown in FIG. 5a with a duration of 2 µsec at 10 volts. Immediately after the constant amplitude voltage pulse 50, a narrow braking pulse 52 is applied that is separated from the constant amplitude voltage pulse 50 by a narrow gap 54. Here the width of the gap 54 is approximately the same as the width of the braking pulse 52. Both widths are smaller than one-half the period of the oscillation of the ribbon elements. The response of the mechanical position of the ribbon element 31 to the applied voltage pulses (constant amplitude voltage pulse 50 and braking pulse 52) is shown in FIG. 5b. The abscissa shows the time in µsec and the ordinate shows the mechanical position of the ribbon element 31 in nanometers. When the voltage pulse 50 is switched on, the ribbon element 31 is drawn into the channel 28 of the GLV device and comes into contact with the bottom of the channel 28. The ribbon element 31 stays in the actuated position (drawn into the channel 28 and in contact with the bottom of the channel 28) for the duration of the constant amplitude voltage pulse 50. As soon as the voltage pulse 50 is turned off, the ribbon element 31 returns to the initial un-actuated position. There are very small oscillations 55 about the initial position of the ribbon element 31, but they do not significantly affect the intensity of the light diffracted into the first order as shown in FIG. 5c. Here the abscissa shows the time in µsec and the ordinate shows the percent intensity of the incident light diffracted into the first order. The intensity is a function of time and the diffracted intensity is constant during the duration of the constant amplitude voltage pulse 50. After the constant amplitude voltage pulse 50 has been turned off the intensity returns to zero. The duration of the $1^{st}$ order diffracted light intensity is now limited to approximately the duration of the constant amplitude voltage pulse 50.

Figure 6A:
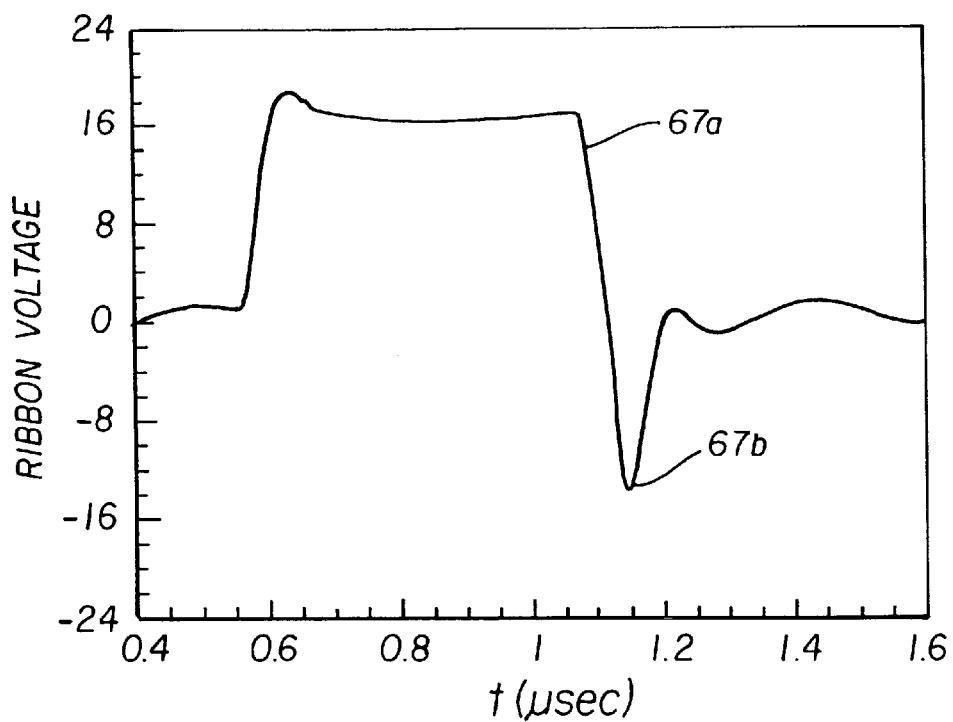
FIGS. 6a–6b are experimental results showing a) an actuation pulse followed by a braking pulse of opposite polarity and b) the corresponding intensity of light reflected into the zeroth order according to the present invention.
Figure 6B:
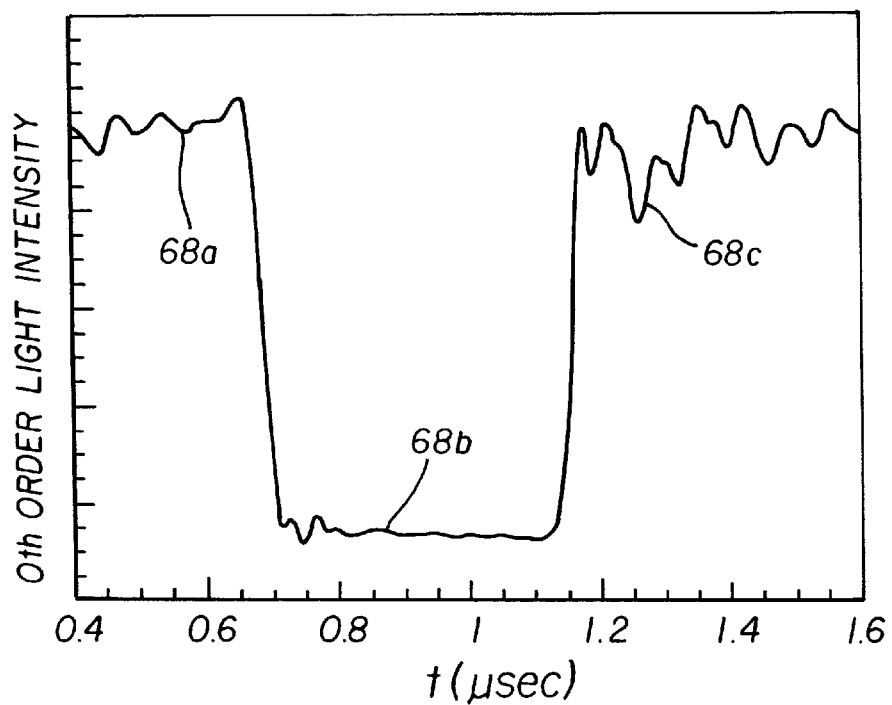

FIGS. 6a and 6b show an experimental result wherein a voltage pulse 67a followed by a braking pulse 67b have been applied to a GLV device of the type shown in FIGS. 1 and 2 in a system that collects $0^{th}$ order reflected light. The voltage pulse 67a in FIG. 6a has a duration of approximately 0.5 µsec and an amplitude of approximately 16 volts. The braking pulse 67b has a polarity opposite to that of the voltage pulse 67b and is approximately −14 volts. The polarity was reversed for the braking pulse 67b because the driver electronics could not slew fast enough to produce a well-formed gap with a positive polarity braking pulse. Unlike the idealized result in FIG. 5a, in this case there is no well-defined gap because of the rise time associated with the driver electronics. The signal from a photodetector measuring the $0^{th}$ order intensity is shown in FIG. 4b (arbitrary units). With no voltage applied the ribbon elements 31, the majority of the light is reflected into the $0^{th}$ order and the $0^{th}$ order signal 68a is at a high level. During the constant amplitude voltage pulse 67a, the $0^{th}$ order signal 68b is constant and at a low level. After the voltage pulse 67a has been turned off and the braking pulse 67b has been applied, the ribbons elements return to their initial un-actuated state without ringing substantially and only a small intensity fluctuation 68c occurs.

Figure 7A:
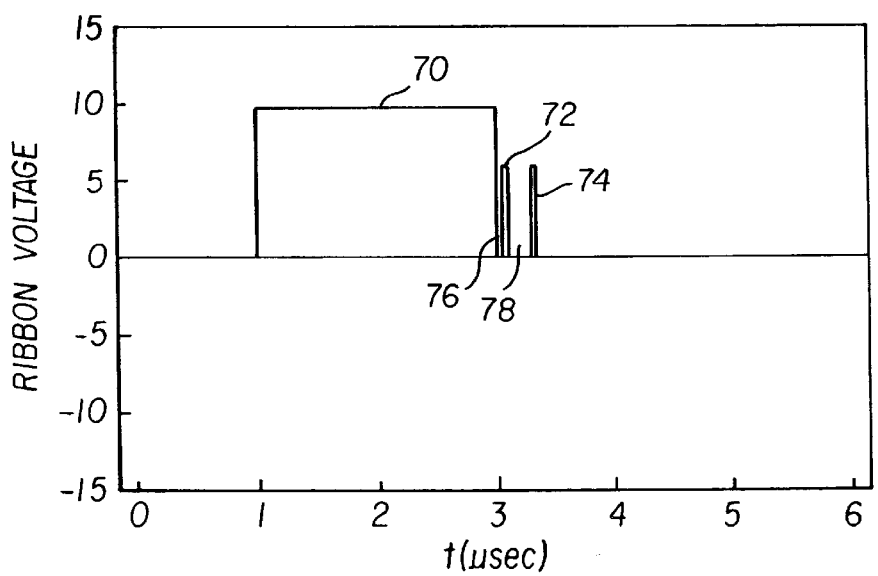
FIGS. 7a–7c are idealized graphs depicting: a) a constant-amplitude voltage pulse that causes the ribbon elements to come into contact with the bottom of the channel followed by two braking pulses; b) the mechanical response of the ribbon elements; and c) the intensity of the light diffracted into the first order according to the present invention.
Figure 7B:
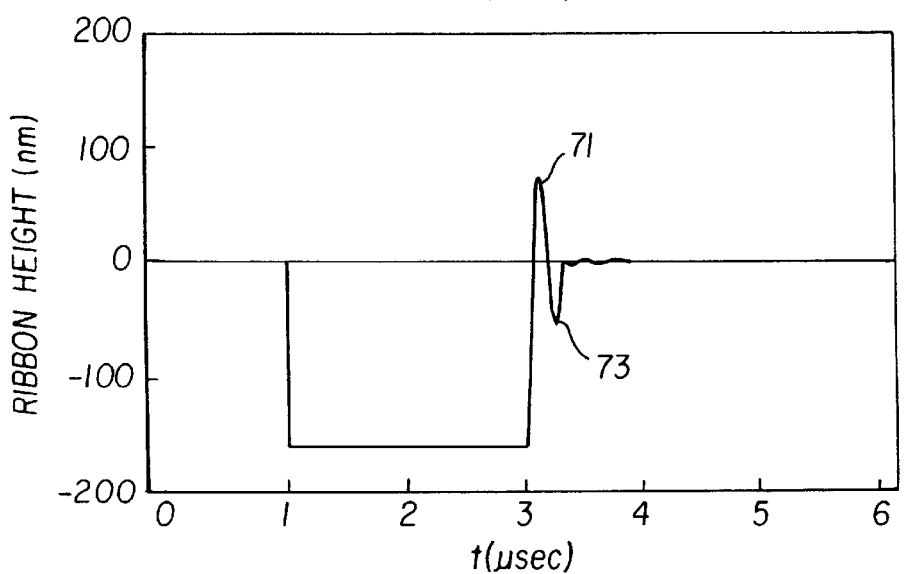
Figure 7C:
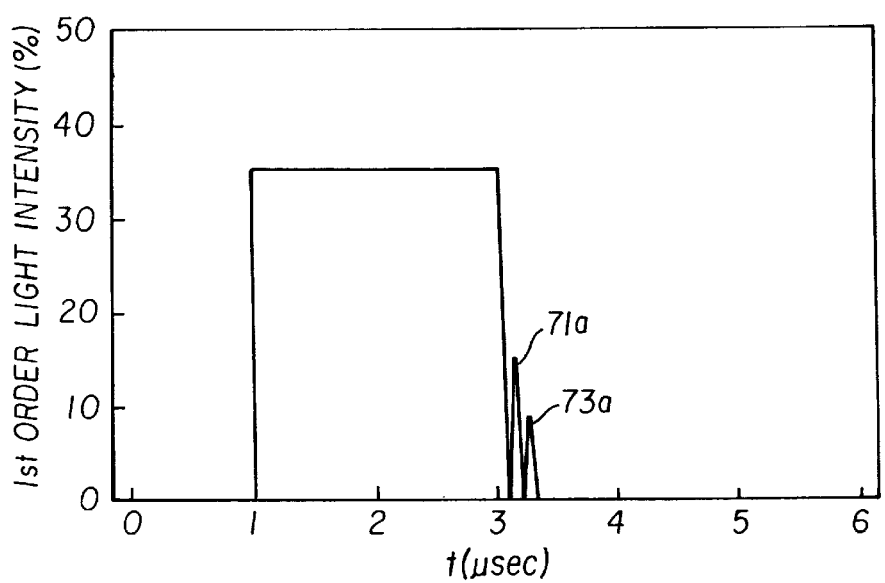

According to a second embodiment shown in FIG. 7a, the actuation of a ribbon element 31 by a constant amplitude voltage pulse 70 is followed by a first and a second braking pulse 72 and 74. This pair of braking pulses can be used in cases when a single braking pulse does not completely stop the ringing of the ribbon elements 31. The constant amplitude voltage pulse 70 is a function of time as shown in FIG. 7a with a duration of 2 µsec at 10 volts. Immediately after the constant amplitude voltage pulse 70, a narrow braking pulse 72 is applied separated from the voltage pulse 70 by a narrow gap 76. The second braking pulse 74 is applied after the first braking pulse 72. Here the two braking pulses 72 and 74 are similar in amplitude and duration. They are separated by a braking gap 78 whose width is approximately equal to the resonant period of the ribbon elements. The response of the mechanical position of the ribbon element 31 to the applied voltage pulses (constant amplitude voltage pulse 70 and first and second braking pulse 72 and 74) is shown in FIG. 7b. When the voltage pulse 70 is switched on, the ribbon element 31 is drawn into the channel 28 and comes into contact with the bottom of the channel 28. The ribbon element 31 stays at the bottom of the channel 28 for the duration of the voltage pulse 70. Once the applied constant voltage pulse 70 is turned off, the ribbon element 31 begins to return to its initial un-actuated position. The application of the first braking pulse 72 reduces the velocity, but not sufficiently to bring the ribbon element 31 to rest. There is a first and second oscillation 71 and 73 about the initial position before the application of the second braking pulse 74. The second braking pulse 74 brings the ribbon to rest. The effect of these additional oscillations 71 and 73 on the intensity of the light diffracted into the first order is to cause a first and a second minor intensity peak 71a and 73a (see FIG. 7c).

Figure 8:
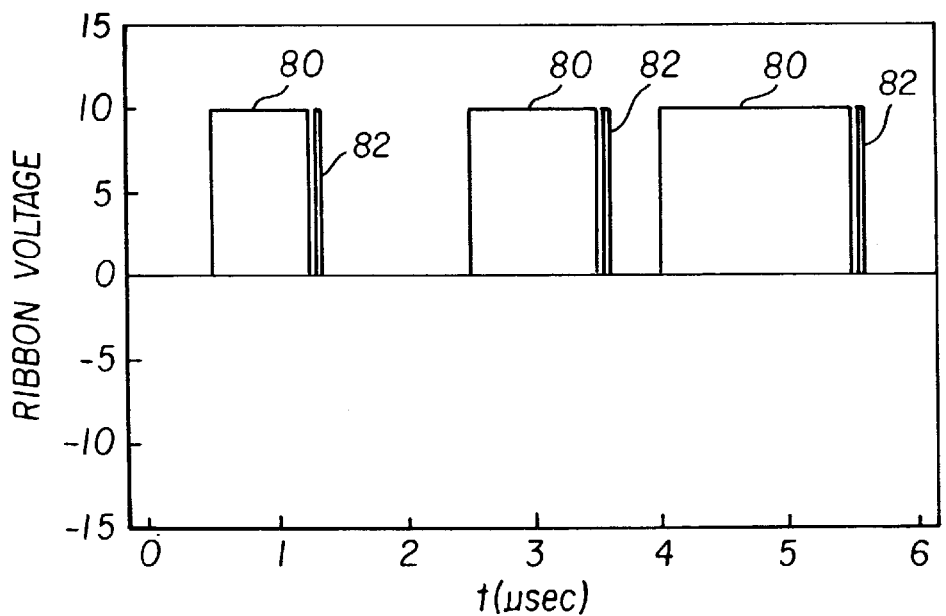
FIG. 8 is an idealized graph of a sequence of actuation voltage pulses each followed by a braking pulse of the same polarity according to the present invention.
Figure 9:
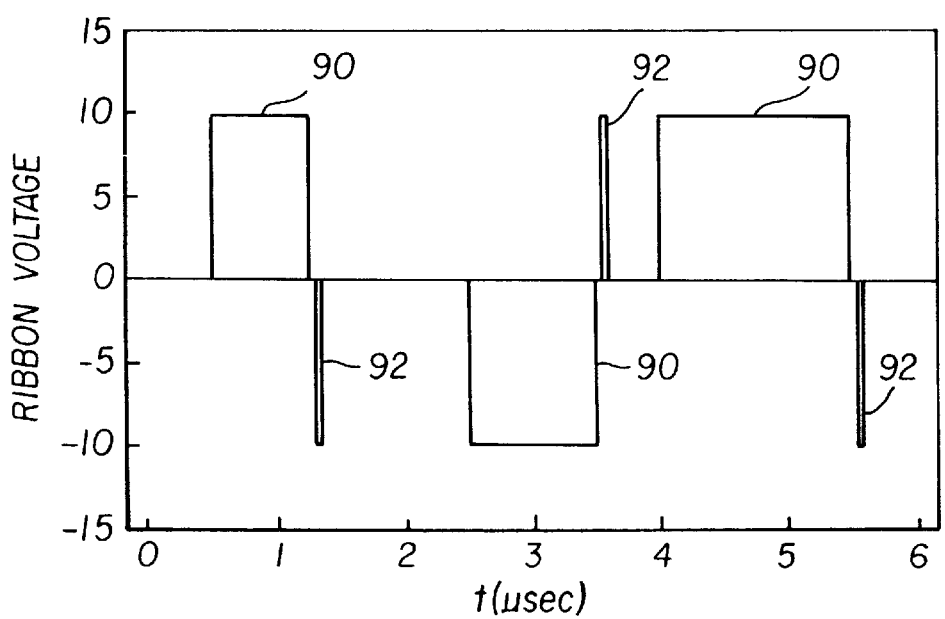
FIG. 9 is an idealized graph of a sequence of actuation voltage pulses each followed by a braking pulse of opposite polarity according to the present invention.

FIGS. 8 and 9 illustrate the use of braking pulses for an incoming data stream that is pulse width modulated. The data are applied to the mechanical ribbon elements 31 as a sequence of actuation pulses that are constant amplitude voltage pulses of various widths (duration). As shown in FIG. 8 each constant amplitude voltage pulse 80 is followed by a braking pulse 82 of the same polarity. FIG. 9 shows an alternative embodiment for the actuation of the mechanical ribbon elements 31. A sequence of constant-amplitude voltage pulses 90 is applied to the ribbon elements 31, wherein adjacent constant amplitude voltage pulses have the opposite polarity. In this embodiment, the polarity of braking pulses is opposite to that of the associated voltage pulses, i.e., opposite to the polarity of the voltage pulse that precedes it. This mode of operation is advantageous when the driver electronics cannot produce well-formed gaps between the constant amplitude voltage pulses and the braking pulses. Switching polarity has the further advantage of minimizing induced charge in the GLV layers.

According to a further embodiment of the present invention, the mechanical ribbon elements 31 are actuated so that they do not contact the bottom of the channel 28. The ribbon elements 31 remain suspended above the bottom of the channel 28 because the constant amplitude voltage pulse does not generate enough electrostatic force to completely overcome the tensile force. This mode of operation is usually used with devices that have a deep channel 28 (approximately one wavelength deep). The amplitude of the voltage pulse is chosen to achieve ¼ wavelength deflection of the ribbon elements 31.

Figure 10A:
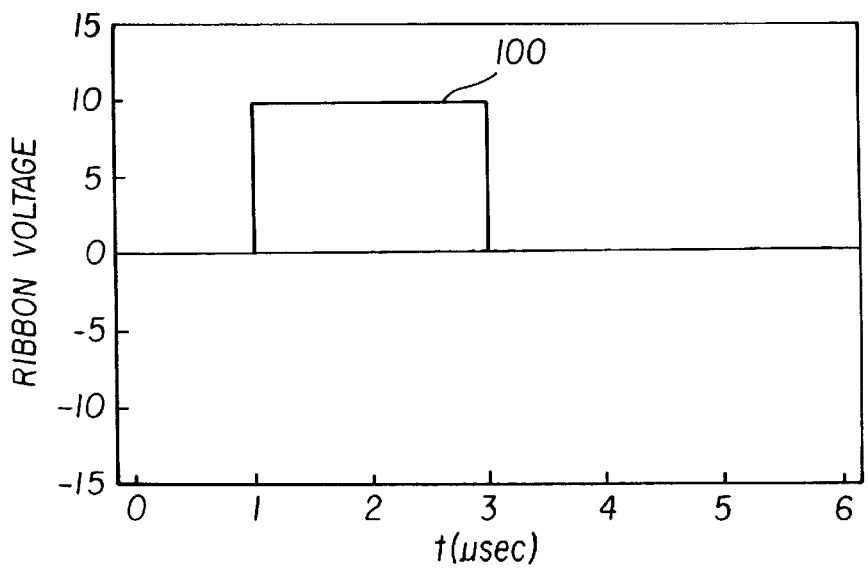
FIGS. 10a–10c are idealized graphs depicting: a) a constant-amplitude voltage pulse that causes the ribbon elements to remain suspended above the bottom of the channel; b) the mechanical response of the ribbon elements; and c) the intensity of the light diffracted into the first order as observed in the prior art.
Figure 10B:
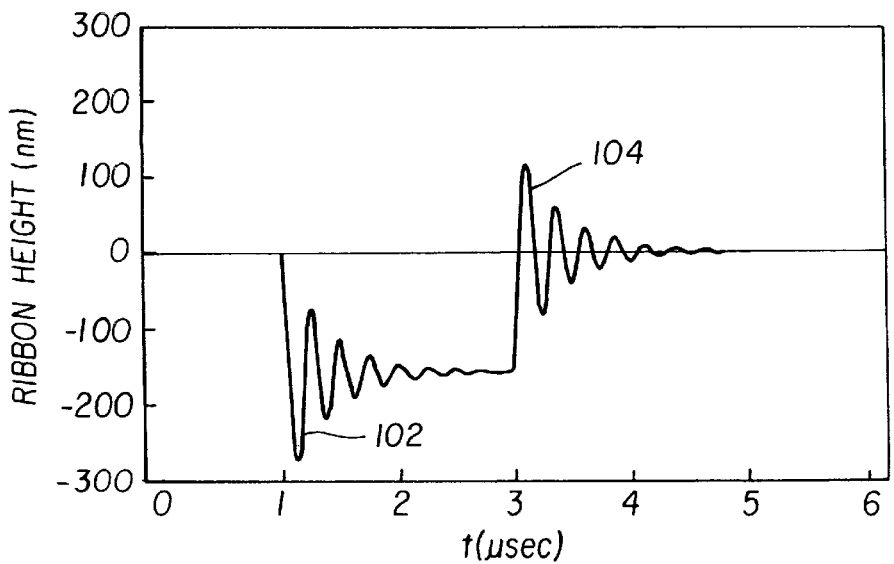
Figure 10C:
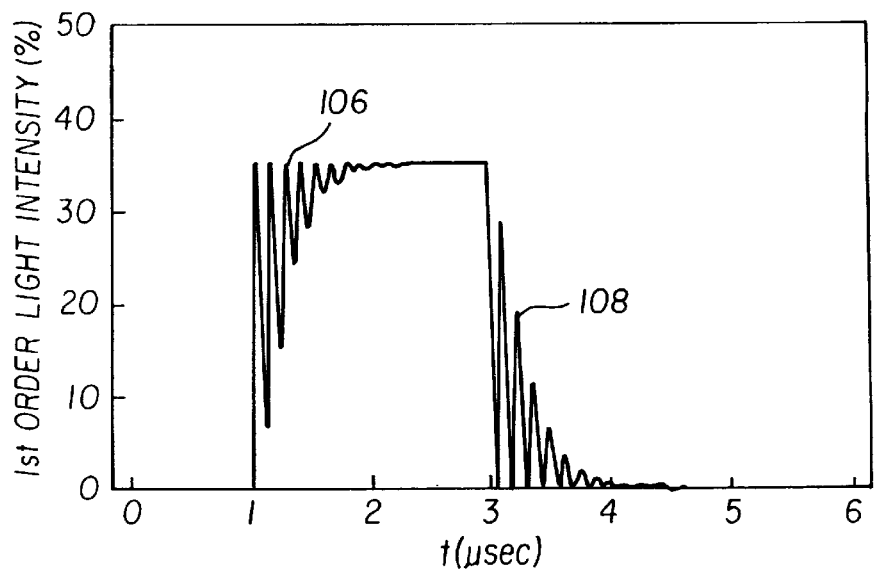

FIGS. 10a–b10c show idealized plots of the actuation of a ribbon element 31 by a constant amplitude voltage pulse 100 for non-contact operation in which the actuated mechanical ribbon does not contact the bottom of the channel 28. The constant amplitude voltage pulse 100 shown in FIG. 10a has a duration of 2 μsec and an amplitude of 10 volts. The response of the ribbon element 31 to the applied constant amplitude voltage pulse 100 is depicted in FIG. 10b. When the constant amplitude voltage pulse is turned on, the ribbon element 31 is drawn into the channel 28 of the GLV device. Since the ribbon element 31 does not contact the bottom of the channel 28, there is pulse onset ringing 102 and pulse shutoff ringing 104 in the response. The onset ringing 102 occurs for nearly the entire duration of the constant amplitude voltage pulse 100. The shutoff ringing 104 occurs for approximately the same amount of time. This ringing affects the intensity of the light diffracted into the first order as shown in FIG. 10c, generating light intensity fluctuations at onset 106 and shutoff 108.

Figure 11A:
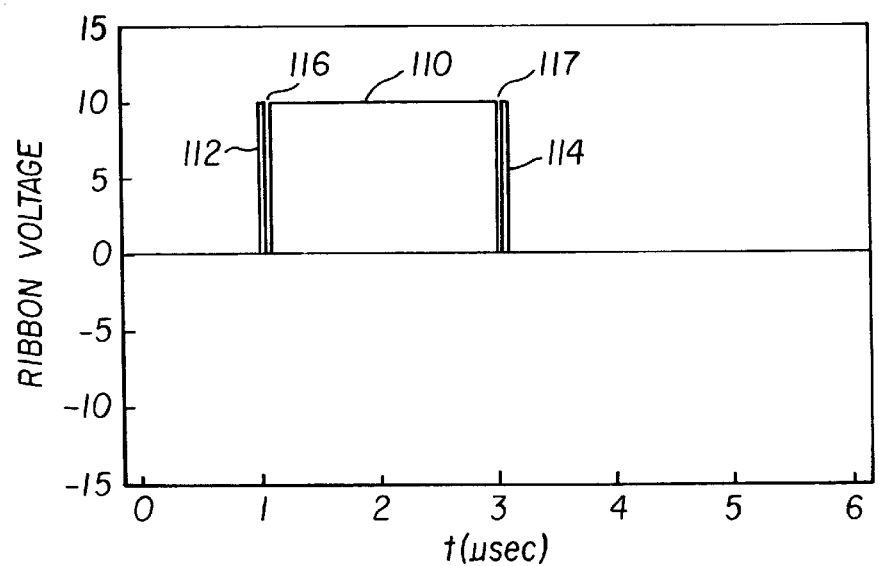
FIGS. 11a–11c are idealized graphs depicting: a) a constant-amplitude voltage pulse that causes the ribbon elements to remain suspended above the bottom of the channel wherein the constant-amplitude voltage pulse is preceded and succeeded by a braking pulse; b) the mechanical response of the ribbon elements; and c) the intensity of the light diffracted into the first order according to the present invention.
Figure 11B:
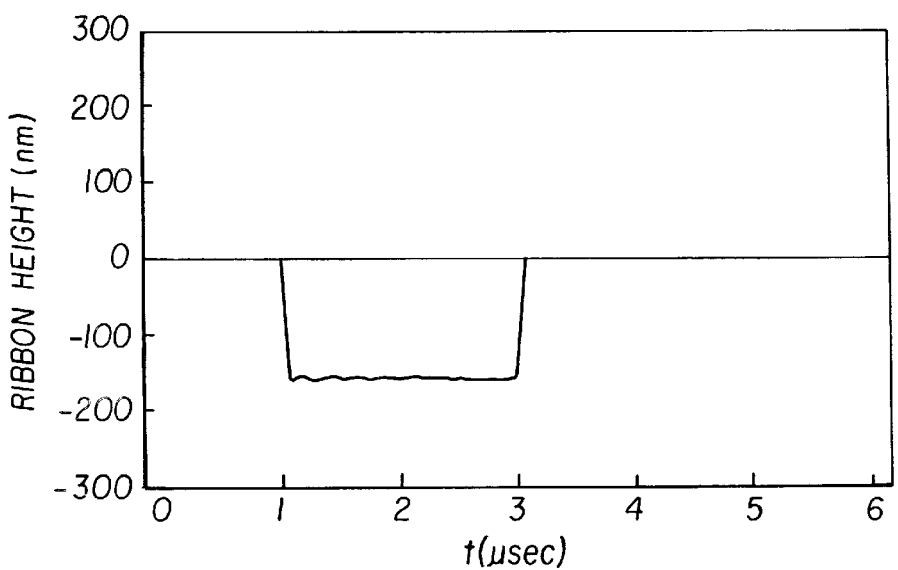
Figure 11C:
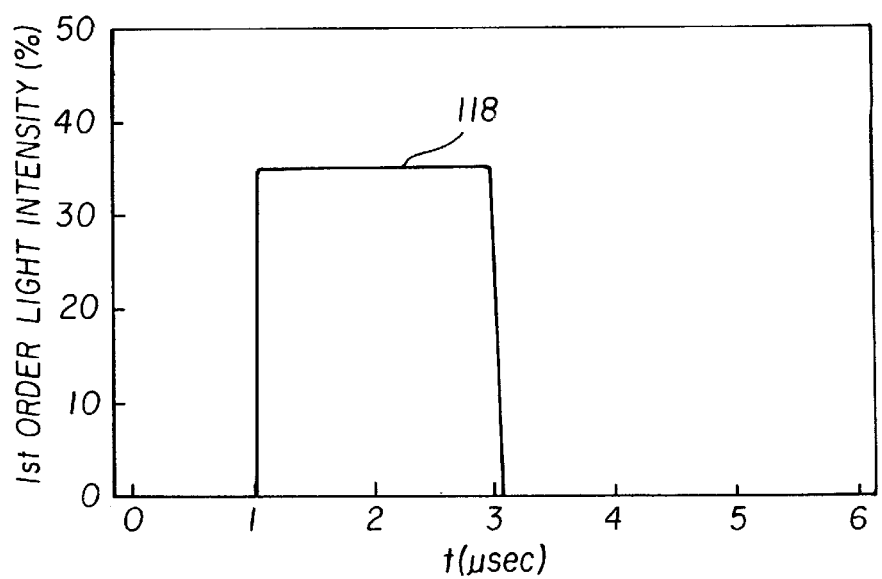

Braking pulses may be used to eliminate ringing in this non-contact mode of operation as well. FIGS. 11a–11c show idealized plots of the actuation of a ribbon element 31 by a constant amplitude voltage pulse 110 preceded by an initial braking pulse 112 and succeeded by a final braking pulse 114 (see FIG. 11a). The braking pulses 112 and 114 are separated from the constant amplitude voltage pulse 110 by an initial gap 116 and a final gap 117. In this example, the two braking pulses 112 and 114 and the two gaps 116 and 117 are all of approximately the same equal width. The response of the mechanical position of the ribbon element 31 to the applied voltage pulses (initial braking pulse 112, constant amplitude voltage pulse 110 and final braking pulse 114) is shown in FIG. 11b. Compared to FIG. 10b there is no pulse onset ringing 102 or pulse shutoff ringing 104 observable. For the duration of the constant amplitude voltage pulse 110, the element stays in a suspended position above the bottom of the channel 28 and the diffraction of the incident light beam takes place. As soon as the applied constant amplitude voltage pulse 110 is turned off, the ribbon element 31 returns into the initial position. There are no significant ribbon oscillations visible at the beginning or at the end of the constant amplitude voltage pulse 110. The intensity of light 118 diffracted into the first order is shown in FIG. 11c. The diffracted intensity is constant during the constant amplitude voltage pulse 110 with no intensity fluctuations observable at turn-on or turn-off. The duration of the intensity in the light diffracted into the first order is now approximately limited to the duration of the constant amplitude voltage pulse 110.

The invention has been described in detail with particular reference to certain preferred embodiments thereof, but it will be understood that variations and modifications can be effected within the spirit and scope of the invention.

PARTS LIST 14 incident light beam
15 reflected light beam
16 incident light beam
17 diffracted light beam $1^{st}$ order
18 diffracted light beam $-1^{st}$ order
20 substrate
22 bottom conductive layer
23 surface of the substrate
24 protective layer
26 spacer layer
27 upper surface level
28 channel
30 riibbon layer
31 ribbon elements
32 reflective layer
34 opening
36 conducting material
40 constant amplitude voltage pulse
42 ringing motion
44 resonant period
44 light diffracted into the first order
46 intensity fluctuation
47 actuation pulse
48a light intensity before actuation
48b light intensity during actuation
48c light intensity after actuation
50 constant amplitude voltage pulse
52 braking pulse
54 gap
55 small oscillations
67a actuation pulse
67b braking pulse of opposite polarity
67a light intensity before actuation
68b light intensity during actuation
68c light intensity after actuation
70 constant amplitude voltage pulse
71 first oscillation
71a first intensity peak
72 first braking pulse
73 second oscillation
73a second intensity peak
74 second braking pulse
76 gap
78 braking gap
80 constant amplitude voltage pulses
82 braking pulses
90 constant amplitude voltage pulses
92 braking pulses
100 constant amplitude voltage pulse
102 pulse onset ringing
104 pulse shutoff ringing
106 onset intensity fluctuation
108 shutoff intensity fluctuation
110 constant amplitude voltage pulse
112 initial braking pulse
114 fmal braking pulse
116 initial gap
117 final gap
118 intensity of light diffracted into the first order

What is claimed is:

1. A method for damping electro-mechanical ribbon elements having a resonant period and being suspended over a channel defining a bottom surface and having a bottom conductive layer formed below said bottom surface, the method comprising the steps of:

providing at least one constant amplitude voltage pulse to at least one ribbon element; and providing at least one braking pulse to said ribbon element wherein said braking pulse is separated by a narrow temporal gap from said constant amplitude voltage pulse.

2. The method as claimed in claim 1 wherein only one braking pulse is applied after said constant amplitude voltage pulse.

3. The method as claimed in claim 2 wherein said temporal gap is smaller than one-half of one resonant period.

4. The method as claimed in claim 2 wherein said braking pulse defines a duration which is smaller than one-half of one resonant period.

5. The method as claimed in claim 2 wherein said braking pulse defines an amplitude which is substantially equal to the amplitude of said constant amplitude voltage pulse.

6. The method as claimed in claim 1 wherein a first and a second braking pulse are applied after said constant amplitude voltage pulse, said first braking pulse is separated by a temporal gap from the constant amplitude voltage pulse and said second braking pulse is separated from said first braking pulse by a braking gap which is approximately equal to one resonant period.

7. The method as claimed in claim 1 wherein said at least one braking pulse has a polarity opposite to the polarity of said constant amplitude voltage pulse.

8. A method for damping electro-mechanical ribbon elements having a resonant period and being suspended over a channel defining a bottom surface and having a bottom conductive layer formed below said bottom surface, the method comprising the steps of:

providing at least one constant amplitude voltage pulse to at least one ribbon element wherein said constant amplitude voltage pulse causes said ribbon element to contact the bottom surface of the channel; and providing at least one braking pulse to said ribbon element wherein said braking pulse is separated by a narrow temporal gap from said constant amplitude voltage pulse.

9. The method as claimed in claim 8 wherein only one braking pulse is applied after said constant amplitude voltage pulse.

10. The method as claimed in claim 9 wherein said temporal gap is smaller than one-half of one resonant period.

11. The method as claimed in claim 9 wherein said braking pulse defines a duration which is smaller than one-half of one resonant period.

12. The method as claimed in claim 9 wherein said braking pulse defines an amplitude which is substantially equal to the amplitude of said constant amplitude voltage pulse.

13. The method as claimed in claim 8 wherein a first and a second braking pulse are applied after said constant amplitude voltage pulse, said first braking pulse is separated by the narrow temporal gap from the constant amplitude voltage pulse and said second braking pulse is temporally separated from said first braking pulse by a braking gap which is approximately equal to an integer number of resonant periods.

14. The method as claimed in claim 8 wherein said at least one braking pulse has a polarity opposite to the polarity of said constant amplitude voltage pulse.

15. A method for damping electro-mechanical ribbon elements having a resonant period and being suspended over a channel defining a bottom surface and having a bottom conductive layer formed below said bottom surface, the method comprising the steps of:

providing at least one constant amplitude voltage pulse to at least one ribbon element wherein said constant amplitude voltage pulse causes said ribbon element to be drawn into the channel wherein said ribbon element is in a suspended actuated state above the bottom of the channel; and providing at least two braking pulses to said ribbon element wherein an initial braking pulse immediately precedes said constant amplitude voltage pulse and a final braking pulse follows said constant amplitude voltage pulse.

16. The method as claimed in claim 15 wherein said two braking pulses have a polarity opposite to the polarity of said constant amplitude voltage pulse.

17. The method as claimed in claim 15 wherein a first temporal gap is defined between the initial braking pulse and the constant amplitude voltage pulse and a second temporal gap is defined between the constant amplitude voltage pulse and the final braking pulse.

18. The method as claimed in claim 17 wherein the first and second temporal gaps have an equal width.

19. The method as claimed in claim 17 wherein the first and second temporal gaps have a width which is smaller than one half of one period of a resonant vibration of said ribbon elements.

20. The method as claimed in claim 15 wherein said initial braking pulse and said final braking pulse define a duration which is smaller than one half of one resonant period.

21. The method as claimed in claim 15 wherein said initial braking pulse and said final braking pulse define an amplitude which is substantially equal to the amplitude of said constant amplitude voltage pulse.

* * * * *